United States Patent
Soncodi (10) Patent No.: US 7,613,111 B2
(45) Date of Patent: Nov. 3, 2009

(54) METHODS, SYSTEMS, AND COMPUTER PROGRAM PRODUCTS FOR DYNAMIC BLOCKING AN UNBLOCKING OF MEDIA OVER PACKET RESOURCES

(75) Inventor: Adrian C. Soncodi, Plano, TX (US)

(73) Assignee: Santera Systems, LLC, Plano, TX (US)

( * ) Notice: Subject to any disclaimer, the term of this patent is extended or adjusted under 35 U.S.C. 154(b) by 779 days.

(21) Appl. No.: 11/108,353

(22) Filed: Apr. 18, 2005

(65) Prior Publication Data

US 2006/0233183 A1 Oct. 19, 2006

(51) Int. Cl.
- *G01R 31/08* (2006.01)
- *H04L 12/28* (2006.01)
- *H04L 12/56* (2006.01)
- *G06F 17/00* (2006.01)
- *G06F 9/00* (2006.01)

(52) U.S. Cl. .............. 370/230; 370/395.2; 370/401; 726/1; 726/12

(58) Field of Classification Search .......... 726/1, 726/2, 3, 4, 12, 13, 17, 21, 26, 27, 28, 29, 726/30; 713/154, 168, 170; 370/395.2, 395.21, 370/395.4, 395.41, 468

See application file for complete search history.

(56) References Cited

U.S. PATENT DOCUMENTS

| | | | |
|---|---|---|---|
| 6,628,629 B1 | 9/2003 | Jorgensen | |
| 6,778,496 B1* | 8/2004 | Meempat et al. | 370/230 |
| 6,876,646 B1* | 4/2005 | Dore et al. | 370/352 |
| 7,149,219 B2* | 12/2006 | Donahue | 370/392 |
| 2003/0021288 A1* | 1/2003 | Hayashi et al. | 370/461 |
| 2003/0109246 A1* | 6/2003 | Shimizu et al. | 455/411 |
| 2003/0123388 A1* | 7/2003 | Bradd | 370/230 |
| 2004/0073690 A1* | 4/2004 | Hepworth et al. | 709/230 |
| 2004/0203450 A1* | 10/2004 | Cho | 455/67.11 |
| 2005/0091409 A1* | 4/2005 | Williams et al. | 709/247 |
| 2006/0251050 A1* | 11/2006 | Karlsson | 370/352 |

FOREIGN PATENT DOCUMENTS

| | | |
|---|---|---|
| WO | WO 01/05100 | 1/2001 |
| WO | WO 02/091692 | 11/2002 |

OTHER PUBLICATIONS

Notification of Transmittal of the International Search Report and the Written Opinion of the International Searching Authority, or the Declaration for International Application No. PCT/US06/13669 (Sep. 14, 2007).

* cited by examiner

*Primary Examiner*—Chirag G Shah
*Assistant Examiner*—Ashley L Shivers
(74) *Attorney, Agent, or Firm*—Jenkins, Wilson, Taylor & Hunt, P.A.

(57) ABSTRACT

Methods, systems, and computer program products for dynamically blocking and unblocking media over packet resources includes, at a first media gateway controller that controls a first media over packet resource, determining whether establishment of calls involving a second media over packet resource managed by second media gateway controller would violate a policy of the first media gateway controller. In response to determining that the establishment of calls involving the second media over packet resource would violate a policy of the first media gateway controller, the first media gateway controller may send a message to the second media gateway controller for limiting the establishment of calls involving the second media over packet resource.

47 Claims, 7 Drawing Sheets

METHODS, SYSTEMS, AND COMPUTER PROGRAM PRODUCTS FOR DYNAMIC BLOCKING AN UNBLOCKING OF MEDIA OVER PACKET RESOURCES

TECHNICAL FIELD

The subject matter described herein relates to managing media over packet resources. More particularly, the subject matter described herein relates to methods, systems, and computer program products for dynamically blocking and unblocking media over packet resources.

BACKGROUND ART

In conventional PSTN networks, voice communications between subscribers use TDM time slots available on voice trunks that interconnect switching offices. The TDM time slot allocated to a single voice call is referred to as a circuit. The circuit is assigned a circuit identifier code (CIC). If either of the switches determines that the circuit is unavailable or should be blocked or unblocked due to quality concerns or for testing, the switch can send an ISDN user part (ISUP) block or unblock message to the other switch informing the other switch that the channel is available or unavailable. The block or unblock message specifies the CIC code corresponding to the circuit.

Figure 1:
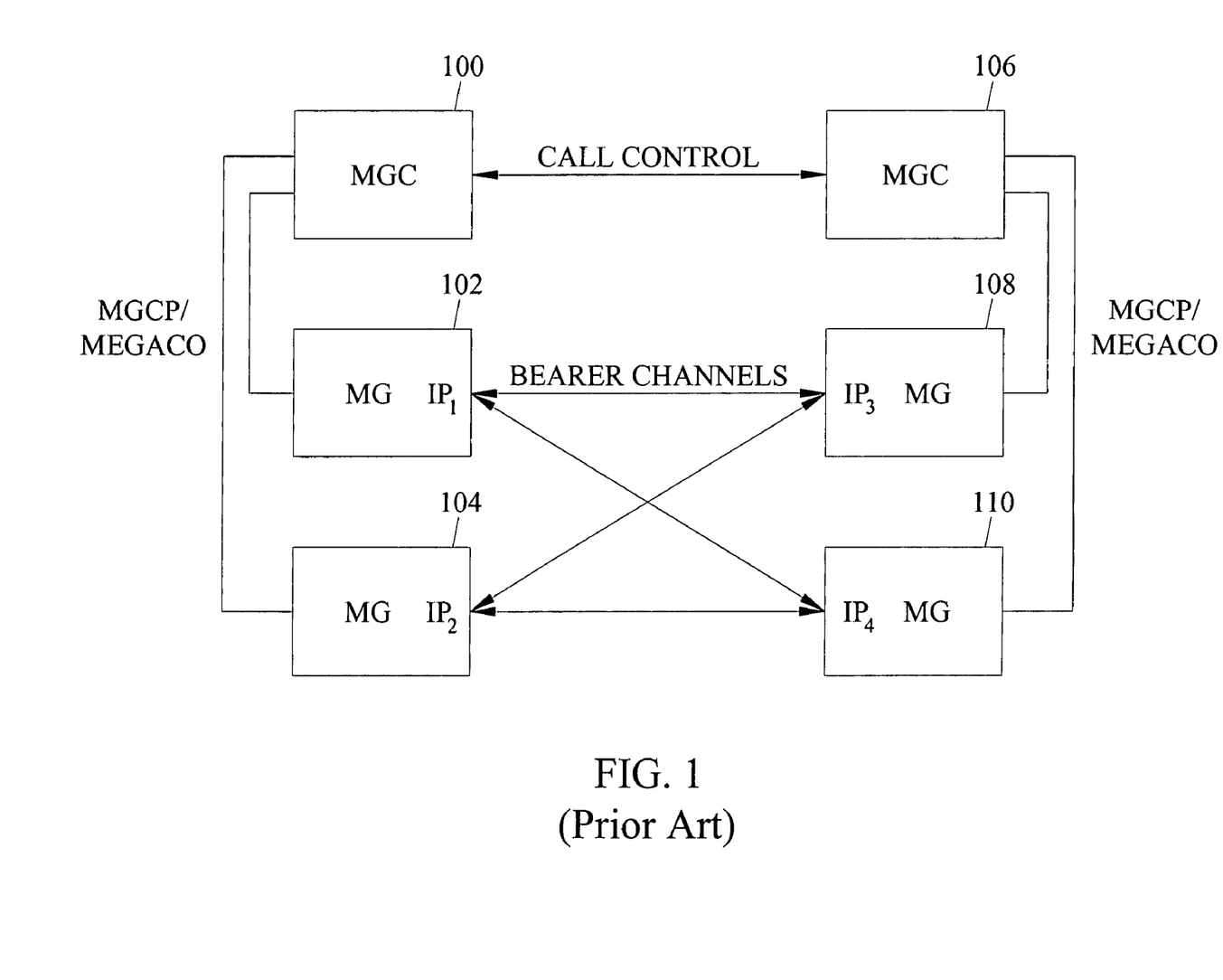
FIG. 1 is a block diagram illustrating a conventional media over packet network.

In media over packet networks, such as voice over IP voice over ATM networks, or any other network in which voice, data, non-voice audio, or video is packetized and sent between users, there is no mechanism by which remote switches can change the status of virtual resources used for bearer channels between the switches. FIG. 1 illustrates a conventional media over packet network. In FIG. 1, a media gateway controller (MGC) 100 controls media gateways 102 and 104. For purposes of illustration, it is assumed that media gateways 102 and 104 respectively use IP addresses $IP_1$ and $IP_2$ as bearer channel endpoints. Similarly, media gateway controller 106 controls media gateways 108 and 110. Media gateways 108 and 110 are assumed to use IP addresses $IP_3$ and $IP_4$ for bearer channel endpoints.

When an originating subscriber desires to establish a call, the media gateway controller associated with the originating subscriber reserves local resources for the call, identifies the remote media gateway controller associated with the destination of the call, and signals with the remote media gateway controller in order for the call to be established. The remote media gateway controller assigns local resources to the call and informs the originating media gateway controller of the resources that have been assigned to the call. Thus, the originating media gateway controller is not involved in the selection of the remote media gateway for the call, which is a shortcoming. In fact, the originating media gateway controller can see call after call failing to reach a remote resource, and currently it has no means to communicate this to the remote media gateway controller, except for blocking all the calls towards it, which is a radical solution, unacceptable.

For example, in FIG. 1, if media gateway controller 100 originates the call, media gateway controller 100 may reserve media gateway 102 as the local endpoint for the call. Media gateway controller 100 may then send a call setup request to media gateway controller 106. Media gateway controller 106 may assign media gateway 108 to the call and inform media gateway controller 100 of the choice. A packet-based bearer channel is then established between media gateways 102 and 108. Packets that contain voice associated with the call are exchanged over the bearer channel.

For purposes of this example, it is assumed that the call between media gateway 102 and media gateway 108 fails to satisfy a quality of service requirement of media gateway controller 100. For example, the owner of media gateway controller 100 may charge its subscribers a premium for high quality calls. If one call associated with a remote resource fails to satisfy the quality of service standard, it may be desirable for media gateway controller 100 not to establish future calls with the remote virtual resource that causes poor quality calls. However, because media gateway controller 106 selects the remote endpoint for the call independently of media gateway controller 100, there is currently no mechanism for media gateway controller 100 to control the remote selection of a media over packet resource.

Several recovery mechanisms may be supported by the packet networks. For example alternate routing or re-routing around failed network nodes. However, these are mechanisms at the transport level, as the packet network core is typically unaware of the service that is transported. Thus, if one network address is unreachable, the network cannot decide on its own to send the packets to another address. This can be decided only at the service level, and it is such a mechanism that is lacking in current media over packet networks.

Accordingly, in light of this shortcoming of conventional media over packet networks, there exists a need for improved methods, systems, and computer program products for dynamically blocking and unblocking media over packet resources.

DISCLOSURE OF THE INVENTION

The subject matter described herein includes methods, systems, and computer program products for dynamically blocking and unblocking media over packet resources. According to the subject matter disclosed herein, a media over packet resource refers to a media gateway, a packet interface (IP, ATM, MPLS, etc.) of a media gateway, or to a set of media gateways or interfaces (for example, a set described by a range of gateway/interface addresses).

Media over packet resources may be dynamically blocked or unblocked by messages exchanged between media gateway controllers. For example, a first media gateway controller may send a message to a second media gateway controller for blocking calls involving a resource managed by the second media gateway controller. The message may specify that all calls involving the remote resource are to be blocked or that calls involving the remote resource and one or more resources managed by the first media gateway controller are to be blocked. As used herein, a call involving media over packet resources includes a connection between the media over packet resources over which voice, data, video, non-voice audio, and/or other media types can be exchanged.

Media over packed resources may be dynamically blocked or unblocked based on a policy decision made by a media gateway controller or other suitable policy decision point. According to the subject matter disclosed herein, the term "policy" refers to a set of at least one condition to be satisfied upon allocating a call to media over packet resources. Such conditions may include any condition that are meant to ensure that the call is acceptable for a media gateway controller with respect to indicators or conditions. Some indicators or conditions may include reliability, performance, voice quality, route cost etc. For example a reliability condition can be that the call is destined to a remote resource that is reachable from the local resource. A voice quality condition can be that the call does not experience delay or packet loss in excess of some given thresholds. The actual values of the indicators that determine whether the call is acceptable or not may change over time, depending on transient network conditions. Thus, a media gateway controller may monitor the conditions and make sure that the calls it sets up are acceptable with respect to the above-defined policy.

One exemplary method for this subject matter includes, at a first media gateway controller configured to control a first media over packet resource, determining whether establishment of calls involving a second media over packet resource managed by a second media gateway controller would violate a policy of the first media gateway controller. In response to determining that the establishment of calls involving the second media over packet resource would violate the policy of the first media gateway controller, the first media gateway controller may send a message to the second media gateway controller for limiting establishment of calls involving the second media over packet resource. Because a local media gateway controller can control allocation of resources by a remote media gateway controller through exchange of messages, policies of the first media gateway controller can be implemented in media over packet networks.

The subject matter described herein can be implemented in hardware, software, firmware, or any combination thereof. In one exemplary implementation, the methods described herein for dynamically blocking and unblocking of media over packet resources can be implemented as a computer program product comprising computer executable instructions embodied in a computer readable medium. Exemplary computer readable media on which the subject matter described herein can be implemented includes chip memory devices, optical and magnetic disks, application specific integrated circuits, programmable logic devices.

BRIEF DESCRIPTION OF THE DRAWINGS

Preferred embodiments of the invention will now be explained with reference to the accompanying drawings of which.

DETAILED DESCRIPTION OF THE INVENTION

Figure 2:
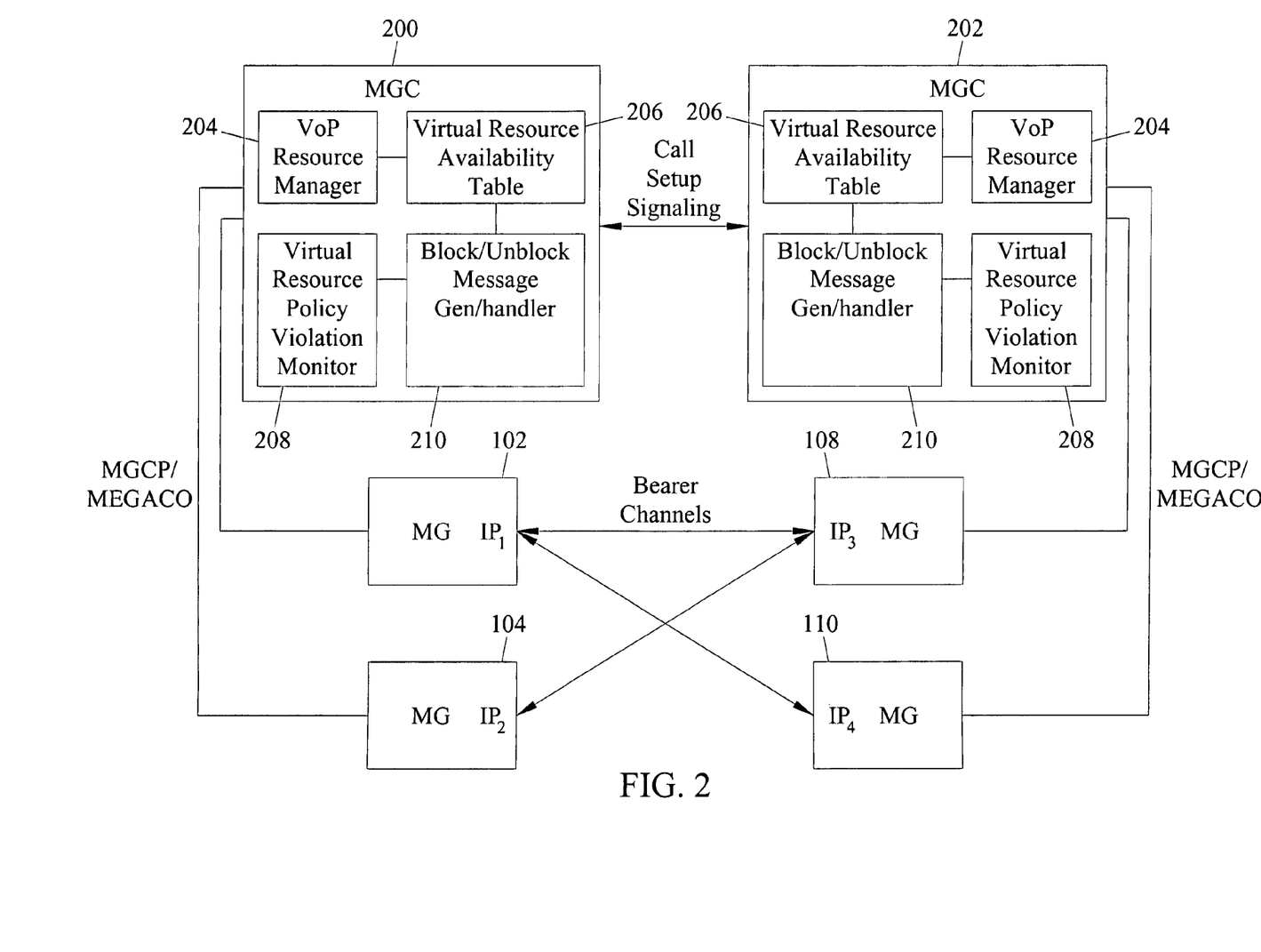
FIG. 2 is a block diagram illustrating a media over packet network including functionality for dynamically blocking and unblocking media over packet resources according to an embodiment of the subject matter described herein.

The subject matter described herein can be implemented in any suitable environment in which control over allocation of media over packet resources is distributed. One example of such an environment is a media over packet network in which allocation of media gateway resources is controlled by different media gateway controllers. FIG. 2 is a block diagram illustrating a media over packet network including functionality for dynamically blocking and unblocking media over packet resources according to an embodiment of the subject matter described herein. Referring to FIG. 2, media gateway controller 200 controls media gateways 102 and 104. Similarly, media gateway controller 202 controls media gateways 108 and 110. For purposes of illustration, it is assumed that media gateways 102, 104, 108, and 110 include IP addresses $IP_1$-$IP_4$, respectively. However, the subject matter described herein is not limited to controlling the blocking and unblocking of media over packet resources in IP networks. The methods and systems described herein may be likewise utilized in any media over packet networks, including voice over ATM and voice over MPLS networks.

In the illustrated example, media gateway controllers 200 and 202 each include a media over packet resource manager 204 for allocating local resources to calls. For example, each media over packet resource manager 204 may select a local media gateway for calls originated or terminated by local subscribers. Such resource allocation may be performed using any suitable method, such as load balancing between local media gateways.

According to one aspect of the subject matter described herein, media over packet resource managers 204 may access virtual resource availability tables 206 to determine whether the resource sought to be allocated is available. Virtual resource availability table 206 may store status information for virtual resources, such as local media gateways or local-remote media gateway pairs. Table 1 shown below illustrates an example of the data that may be maintained in virtual resource availability tables 206.

TABLE 1

| Virtual Resource Availability Status | |
|---|---|
| Virtual Resource | Status |
| $IP_1$-$IP_3$ | Available |
| $IP_1$-$IP_4$ | Blocked |
| $IP_2$-$IP_4$ | Available |
| $IP_2$-$IP_3$ | Available |

In Table 1, the first column identifies virtual resources that may be maintained by media gateway controller 200. In the illustrated example, the virtual resources include pairs of IP addresses corresponding to possible bearer channel paths associated with media gateways controlled by media gateway controller 202. The second column in Table 1 represents the status of each virtual resource. In the illustrated example, the status is set to available or blocked. As will be described in detail below, the status may be updated based on messages received from the remote media gateway controller.

In an alternate implementation, rather than controlling and maintaining status for virtual resources corresponding to pairs of local and remote media gateway endpoints or IP addresses, the subject matter described herein may include controlling maintaining status for individual remote virtual resources at each media gateway controller. In such an implementation, Table 1 described above and Table 2 shown below may be modified such that each row corresponds to an individual remote MG endpoint or IP address, rather than a local-remote MG endpoint or IP address pair.

Messages exchanged between MGCs for limiting the establishment of calls to a from a remote virtual resource may specify that calls involving a remote virtual resource are to be limited, regardless of the local resource. Alternatively, the messages exchanged between MGCs for limiting the establishment of calls may specify combinations of local and remote resources between which calls are to be limited.

Although in Tables 1 and 2, virtual resources are identified by IP addresses, the subject matter described herein is not limited to using IP addresses to identify virtual resources. Any suitable local and/or remote identifier for identifying virtual resources is intended to be within the scope of the subject matter described herein. Examples of alternate identifiers that may be used to identify virtual resources include local and/or remote ATM addresses, multiprotocol label switching (MPLS) addresses, or address prefixes denoting multiple addresses corresponding to a number of network resources.

In FIG. 2, each media gateway controller includes a virtual resource policy violation monitor 208 and a block/unblock message generator/handler 210. Virtual resource policy violation monitor 208 monitors calls between media gateways 102 and 104 and remote media gateways 108 and 110 and determines whether the calls violate a policy of media gateway controller 200. For example, virtual resource policy violation monitor 208 may maintain statistics with regard to calls corresponding to virtual resources. Exemplary statistics that may be maintained include packet loss, jitter, delay, and reachability. Table 2 shown below illustrates an example of statistics that may be maintained by virtual resource policy violation monitor 208.

TABLE 2

Virtual Resource Statistics

| Virtual Resource | Packet Loss | Delay | Jitter | Reachability |
|---|---|---|---|---|
| $IP_1$-$IP_3$ | 5% | 1 ms | 1% | Y |
| $IP_1$-$IP_4$ | 0% | 3 ms | 2% | Y |
| $IP_2$-$IP_4$ | 10% | 5 ms | 1% | Y |
| $IP_2$-$IP_3$ | 3% | 10 ms | 3% | Y |

In Table 2, each virtual resource is identified by a local IP address and a remote IP address. Statistics that are maintained for each virtual resource include packet loss, delay, jitter and reachability. These statistics may be collected by monitoring packets associated with calls that use each virtual resource. In addition, virtual resource policy violation monitors 208 may periodically establish test calls involving each virtual resource to maintain current status. When one of the statistics exceeds a predetermined threshold, each virtual resource policy violation monitor 208 may trigger the sending of a block message to the remote media gateway controller associated with the virtual resource. For example, if packet loss on the virtual resource identified by IP addresses $IP_1$-$IP_3$ exceeds a predetermined percentage, such as 5%, virtual resource policy violation monitor 208 may trigger block/unblock message generator/handler 210 to send a block message to the media gateway controller associated with the virtual resource. Similarly, when virtual resource policy violation monitor 208 determines that a policy is no longer violated or that a block timer has expired, virtual resource policy violation monitor 208 may trigger block/unblock message generator/handler 210 to send an unblock message to a remote MGC requesting that the remote MGC unblock the virtual resource.

The subject matter described herein is not limited to monitoring the parameters illustrated in Table 2. Additional parameters on which policies may be based include parameters imposing restrictions on call bandwidth, call media type, such as audio or video data type, calling or called subscriber type (e.g., premium or regular subscriber type), incoming or outgoing trunk group type (e.g., packet or TDM trunk group type), class of service (CoS) parameters, or QoS parameters.

Block/unblock message generator/handler 210 generates block and unblock messages based on the status of each virtual resource. For example, when block/unblock message generator/handler 210 is notified that a policy of its local media gateway controller is violated for a particular virtual resource, block/unblock message generator/handler 210 may generate a block message and send the block message to the remote media gateway controller associated with the virtual resource. Similarly, when block/unblock message generator/handler 210 receives notification that a blocked resource no longer violates a policy, block/unblock message generator/handler 210 may generate an unblock message and send the unblock message to the remote media gateway controller associated with the virtual resource. When a block or unblock message is received from a remote media gateway controller, blocked/unblock message generator/handler 210 may update the corresponding status in virtual resource availability table 206.

The block or unblock messages generated by a media gateway controller according to an embodiment of the subject matter described herein may be sent independently of other messages exchanged between the media gateway controllers in response to violation or cessation of violation of a local policy. In an alternate implementation, the block and unblock messages may be included as additional indications in other messages exchanged between media gateway controllers. For example, the block or unblock messages may be included in call setup signaling messages exchanged between the media gateway controllers.

The block or unblock messages may include an identifier of the virtual resource sought to be blocked or unblocked, an identifier for the sending media gateway controller, and optional additional parameters. The identifier for the virtual resource sought to be blocked or unblocked may include an IP or ATM address associated with the virtual resource sought to be blocked or unblocked. For example, in the network illustrated in FIG. 2, a block message sent from media gateway controller 200 to media gateway controller 202 to block calls to or from media gateway 108 may include the IP address $IP_3$. In addition, if it is desirable only to block calls between media gateway 102 and media gateway 108 but to allow calls from media gateway 104 and media gateway 108, the virtual resource identifier may include the IP address pair ($IP_1$, $IP_3$). One additional parameter that may be included in the block or unblock message is an expiration time or duration for the block request. In response to receiving a block message with a time parameter, the media gateway may block a resource until the time occurs or the duration expires.

Figure 3:
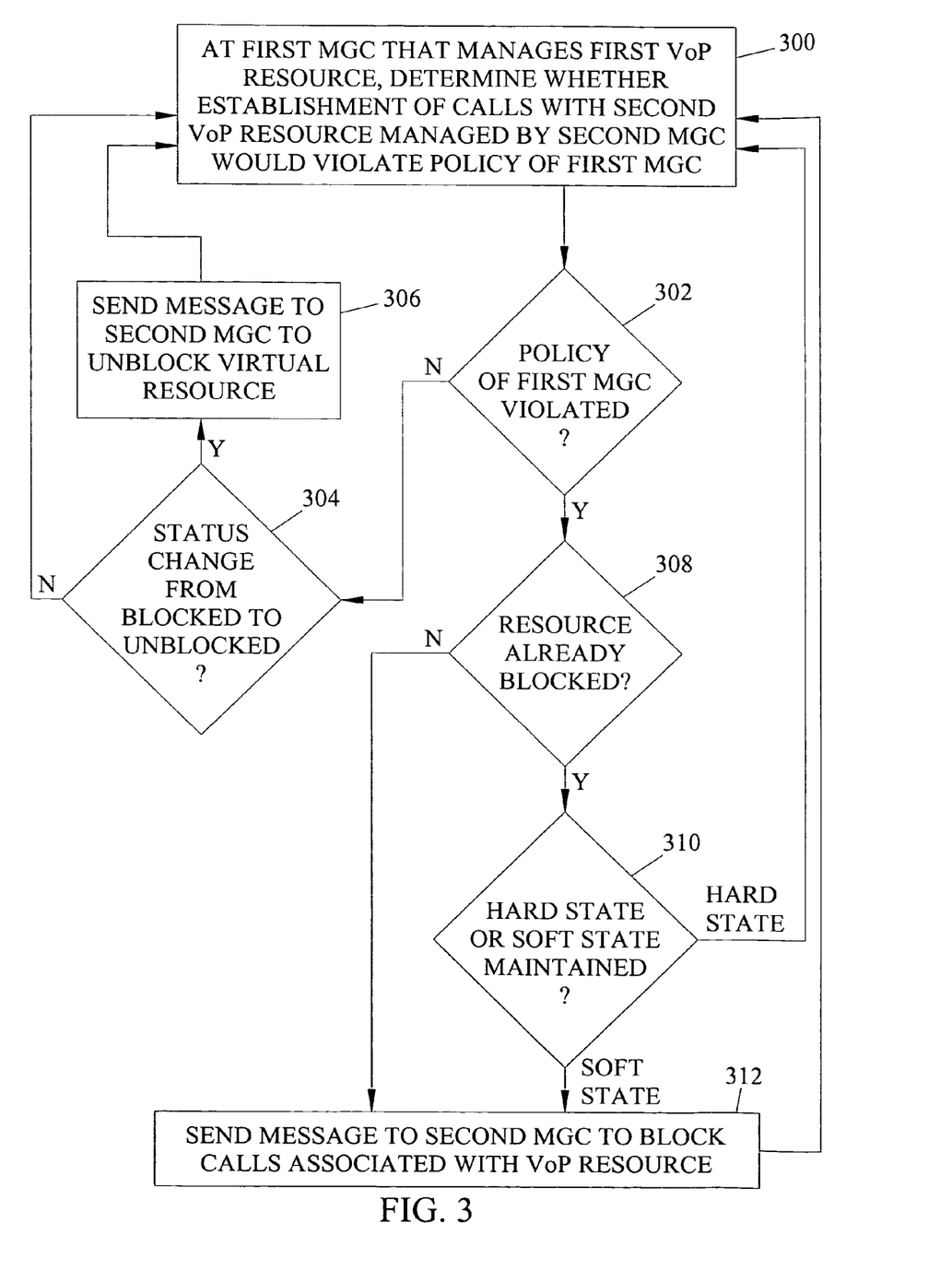
FIG. 3 is a flow chart illustrating exemplary steps implemented by a local media gateway controller for dynamically blocking and unblocking media over packet resources associated with a remote media gateway controller according to an embodiment of the subject matter described herein.

FIG. 3 is a flow chart illustrating exemplary steps that may be performed by a media gateway controller in dynamically blocking and unblocking media over packet resources according to an embodiment of the subject matter described herein. Referring to FIG. 3, in step 300, a first media gateway controller that manages a first VoP resource determines whether establishment of calls with a second VoP resource managed by a second media gateway controller would violate a local policy of the first media gateway controller. Examples of policies include any of the policies described above, such as Quality-of-Service-based (QoS-based) policies. Determining whether the policy has been violated may include collecting statistics regarding calls with the remote VoP resource and comparing the statistics to thresholds set based on local policies. In step 302, if it is determined that the policy of the first media gateway controller has not been violated, control proceeds to step 304 where it is determined whether the status of the media over packet resource has changed from blocked to unblocked. Status may change from blocked to unblocked when a remote media gateway becomes reachable or quality of service exceeds a one of the threshold levels set by the first media gateway controller based on local policies. If the status changes from blocked to unblocked, control proceeds to step 306 where the first media gateway controller sends a message to the remote media gateway controller to unblock the virtual resource.

Returning to step 302, if it is determined that a policy of the first media gateway controller has been violated, control proceeds to step 308 where it is determined whether the resource is already blocked. If the resource is already blocked, control proceeds to step 310 where it is determined whether hard state or soft state is maintained for media over packet resources. A hard state implementation refers to an implementation where, once a media over packet resource becomes blocked, the resource remains blocked until an unblock message is received from the remote media gateway controller. A hard state implementation requires reliable communications between the media gateway controllers to avoid blocking resources even after the resources no longer violate the policy of the media gateway controller that initiated the block.

A soft state implementation refers to an implementation where once the resource is blocked, the block may expire if it is not refreshed by the blocking media gateway controller. For example, in order to maintain a resource as blocked, the blocking media gateway controller may be required to periodically send block messages to the remote media gateway controller. If the block messages cease, the resource status automatically changes to unblocked after a predetermined time period. Accordingly, returning to step 310, if hard state is maintained and the resource is already blocked, the status of the resource is maintained as blocked and control returns to step 300. If, however, soft state is maintained, when a policy violation is detected or continued to be detected, control proceeds to step 312 where the first media gateway controller sends a message to the second media gateway controller to block calls associated with the virtual resource. Steps 300-312 may be performed periodically to maintain the blocked status of the resource as long as the policy of the first media gateway controller continues to be violated.

Figure 4A:
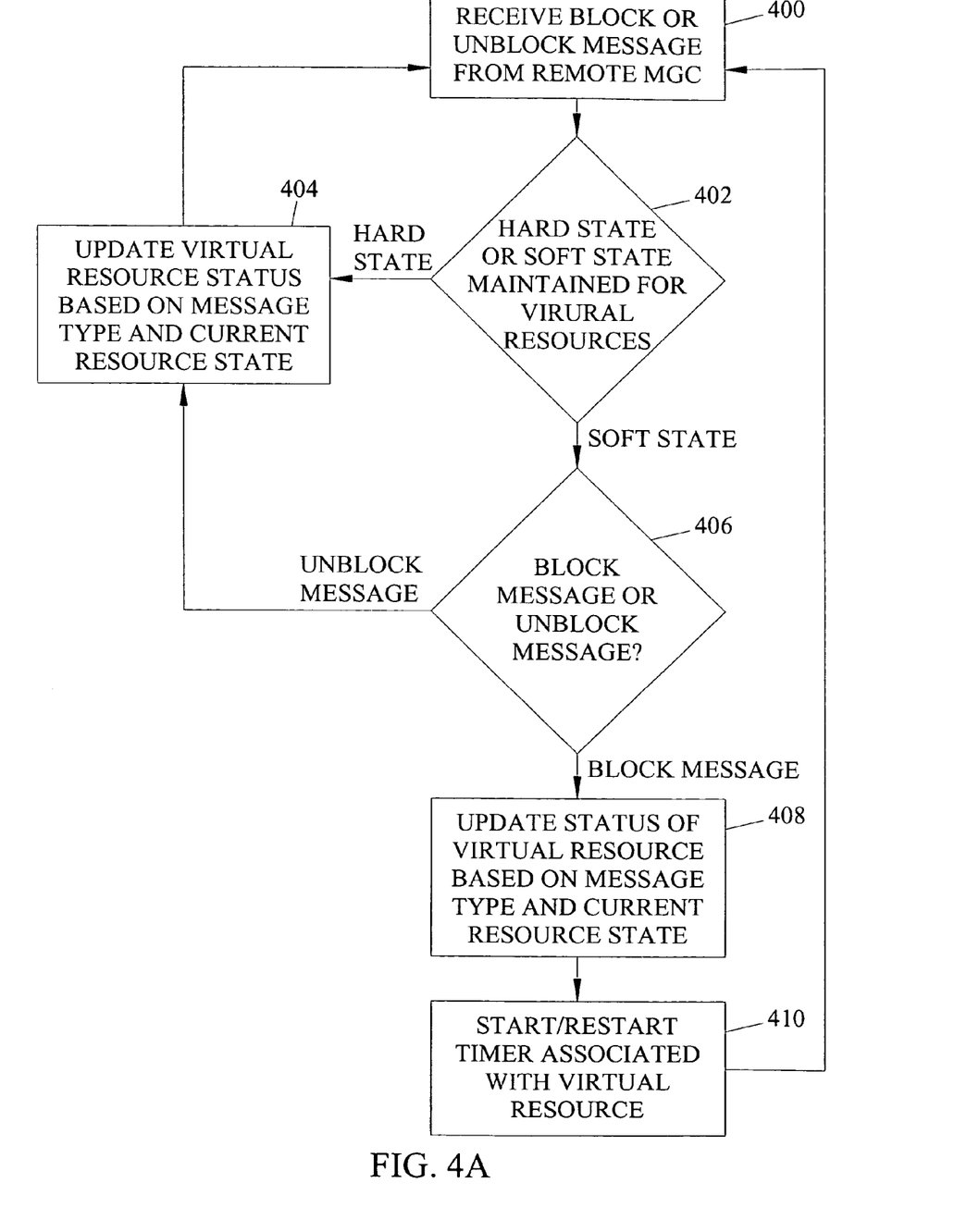
FIGS. 4A and 4B are a flow chart illustrating exemplary steps that may be implemented at a media gateway controller in maintaining media over packet resource status in response to block and unblock messages received from a remote media gateway controller according to an embodiment of the subject matter described herein.
Figure 4B:
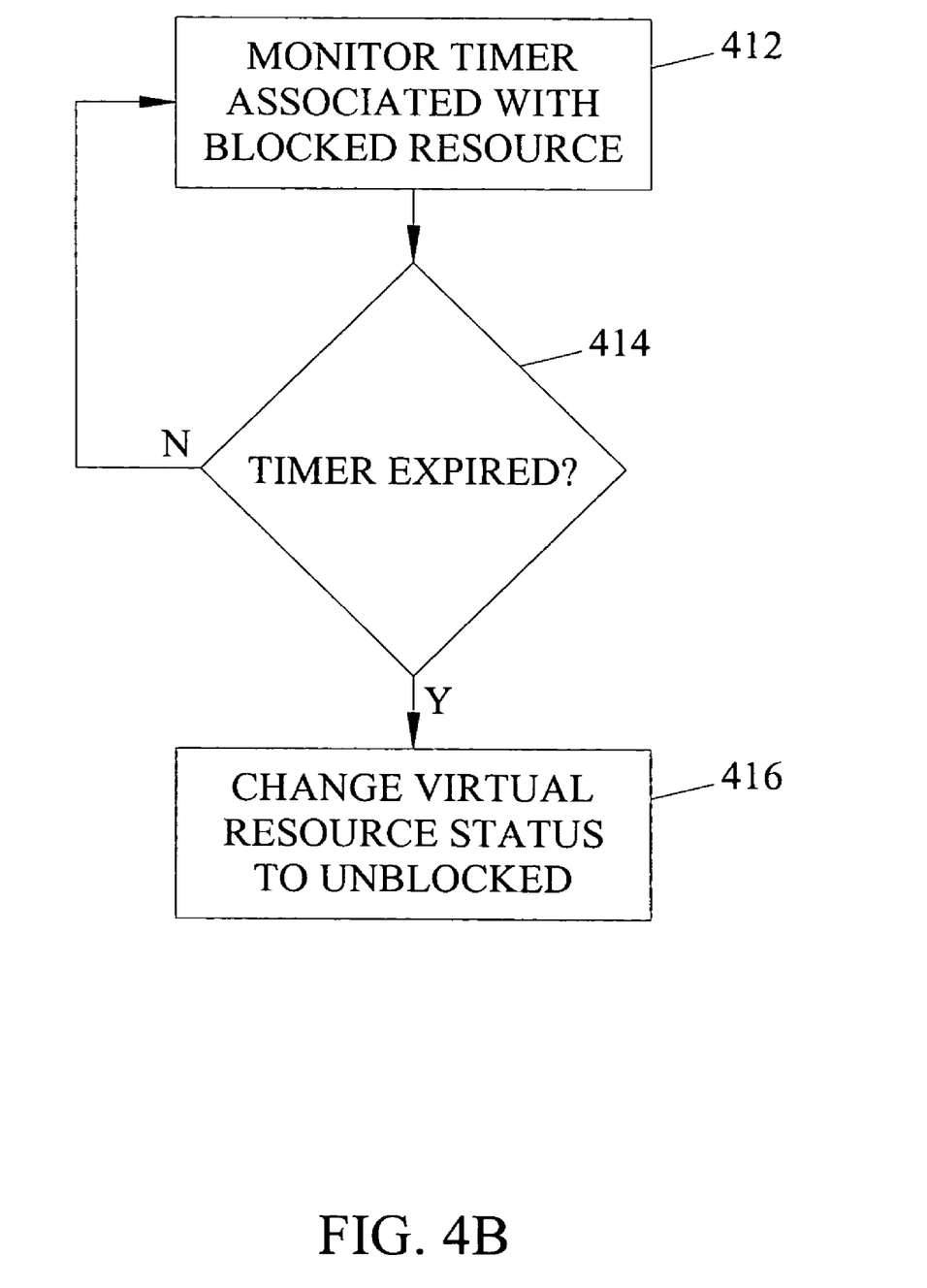

FIGS. 4A and 4B are a flow chart illustrating exemplary steps that may be performed by a media gateway controller in response to receiving a block message or an unblock message from a remote media gateway controller. Referring to FIG. 4A, in step 400, the media gateway controller receives a block or unblock message from a remote media gateway controller. In step 402, the media gateway controller determines whether hard state or soft state is maintained for virtual resources managed by the media gateway controller. If hard state is maintained, control proceeds to step 404 where the media gateway controller updates the virtual resource status based on the message type and the current resource state. For example, if the message is a block message and the status of the virtual resource corresponding to the block message is unblocked, the media gateway controller may change the status of the virtual resource to blocked. If the message is a block message and the resource is already blocked, no change in status is necessary. If the virtual resource is blocked and an unblock message is received, the media gateway controller may change the status of the virtual resource to unblocked. If the status of the virtual resource is unblocked and an unblock message is received, the media gateway controller may maintain the current status.

In step 402, if the media gateway controller maintains soft state for virtual resources, control proceeds to step 406 where it is determined whether the message is a block message or an unblock message. If the message is an unblock message, control returns to step 404 where the virtual resource status is updated based on the message type and the current state as described above. Control then returns to step 400 where the next message is received.

If in step 406 it is determined that a block message is received, control proceeds to step 408 where the status of the virtual resource is updated based on the message type and the current resource state. This step may be performed in the same manner as 404 described above. In step 410, the media gateway controller starts or restarts a timer associated with the virtual resource. Control then returns to step 400 where the next message is received.

FIG. 4B illustrates exemplary steps that may be performed simultaneously or in a time-sliced processor sharing manner with the steps illustrated in FIG. 4A to automatically unblock a virtual resource in a soft state implementation. Referring to FIG. 4B, in step 410, the media gateway controller monitors the timer associated with each blocked resource. In step 414, the media gateway controller determines whether the timer has expired. If the timer has not expired, control returns to step 412 where the timer is continuously monitored. If the timer has expired, control proceeds to step 416 where the status of the virtual resource is changed to unblocked. Control then returns to step 410 where the current status of each blocked resource is monitored.

Figure 5:
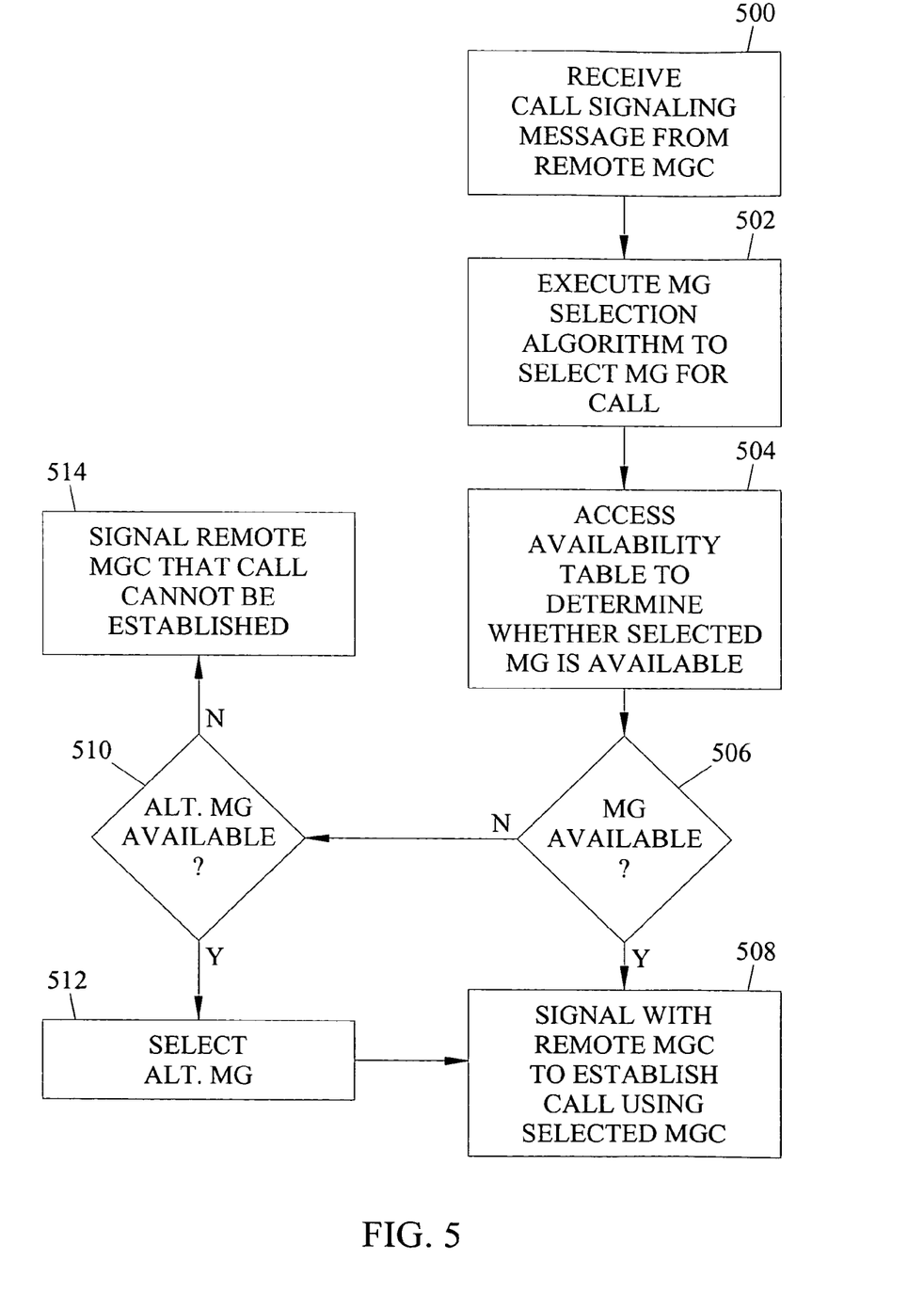
FIG. 5 is a flow chart illustrating exemplary steps that may be implemented by a media gateway controller in allocating resources for a call using media over packet status information generated by the methods and systems described herein.

FIG. 5 is a flow chart illustrating exemplary steps that may be performed by a media gateway controller in order to allocate resources to a session. Referring to FIG. 5, in step 500, a call signaling message is received from a remote media gateway controller. The call signaling message may be any suitable call signaling message, such as a SIP INVITE message or an ISUP IAM message. Alternatively, the call signaling message may be an H.323 call signaling message or a bearer independent call control (BICC) call signaling message. In step 502, the media gateway controller executes a media gateway selection algorithm to select the media gateway for the call. Step 502 may include selecting the media gateway using any suitable algorithm, such as round robin load sharing. In step 504, the media gateway controller accesses its availability table to determine whether the selected media gateway is available. In step 506, if the selected media gateway is available, control proceeds to step 508 where the media gateway controller signals with the remote media gateway controller to establish the call with the selected media gateway.

Returning to step 506, if the selected media gateway is not available, i.e., because the media gateway is blocked, control proceeds to step 510 where the media gateway controller determines whether an alternate media gateway is available. If an alternate media gateway is available, control proceeds to step 512 where the media gateway controller selects the alternate media gateway for the call. Control then returns to step 508 where the media gateway controller signals with a remote media gateway controller to establish the call with the selected alternate media gateway. In step 510, if an alternate media gateway is not available, control proceeds to step 512 where the media gateway controller signals the remote media gateway controller that the call cannot be established.

As described above, the subject matter described herein includes methods, systems, and computer program products for dynamically blocking and unblocking media over packet resources. However, the subject matter described herein is not limited to blocking and unblocking media over packet resources. In an alternate implementation, messages may be exchanged between media gateway controllers to throttle or un-throttle the number of calls that use a particular media over packet resource. The messages that throttle or un-throttle the use of a particular media over packet resource may be sent in response to violation or cessation of violation of a policy of a media gateway controller in the manner described above for block and unblock messages. An example situation where throttling, rather than blocking, would be required is when a network resource experiences congestion while still operational. In this case, the number of calls to/from that resource is reduced, rather than completely blocked, in order to ease up the congestion on the resource.

In addition, while the methods described above relate primarily to quality-of-service-based policies at a media gateway controller, the subject matter described herein is not limited to sending block and unblock messages based on quality-of-service-based policies. In an alternate example, the policy may be a time of day policy where the first media gateway controller sends a block message to blocked calls from a particular media over packet resources during certain time periods. The blocked resources may become automatically unblocked when the time period expires. Alternatively, the media gateway controller may be required to send an unblock message to unblock the resources.

Another aspect of the subject matter described herein concerns the packet network monitoring and decision-making with respect to the dynamic changes in the conditions that affect the blocking and unblocking policies. These functions can be allocated in several ways to multiple network elements, as follows.

A first possibility (the one that was assumed throughout the foregoing presentation) is to assign the monitoring and decision-making functions to the media gateway controllers. This presents immediate advantages, in that the media gateway controllers possess service-level information about the network from several adjoint mechanisms that they may support, including collecting call statistics, performing periodic test calls or reachability tests. The subject matter described herein allows the integration of these adjoint mechanisms into a larger, service-level resource management function.

Another possibility is to have one or more separate decision-making points that receive network status information (in the form of notifications) from many different network elements, not just from media gateway controllers. These decision points can implement global network policies and communicate the decision to the media gateway controllers, thus off-loading a part of their work. Suitable protocols for relaying information from a policy decision point (PDP) to a policy enforcing point (PEP) are available, for example COPS (an existing IETF standard) or Dynamic QoS (PacketCable standard). This architecture is particularly suitable for networks where a more centralized approach to routing and decision-making is taken.

Figure 6:
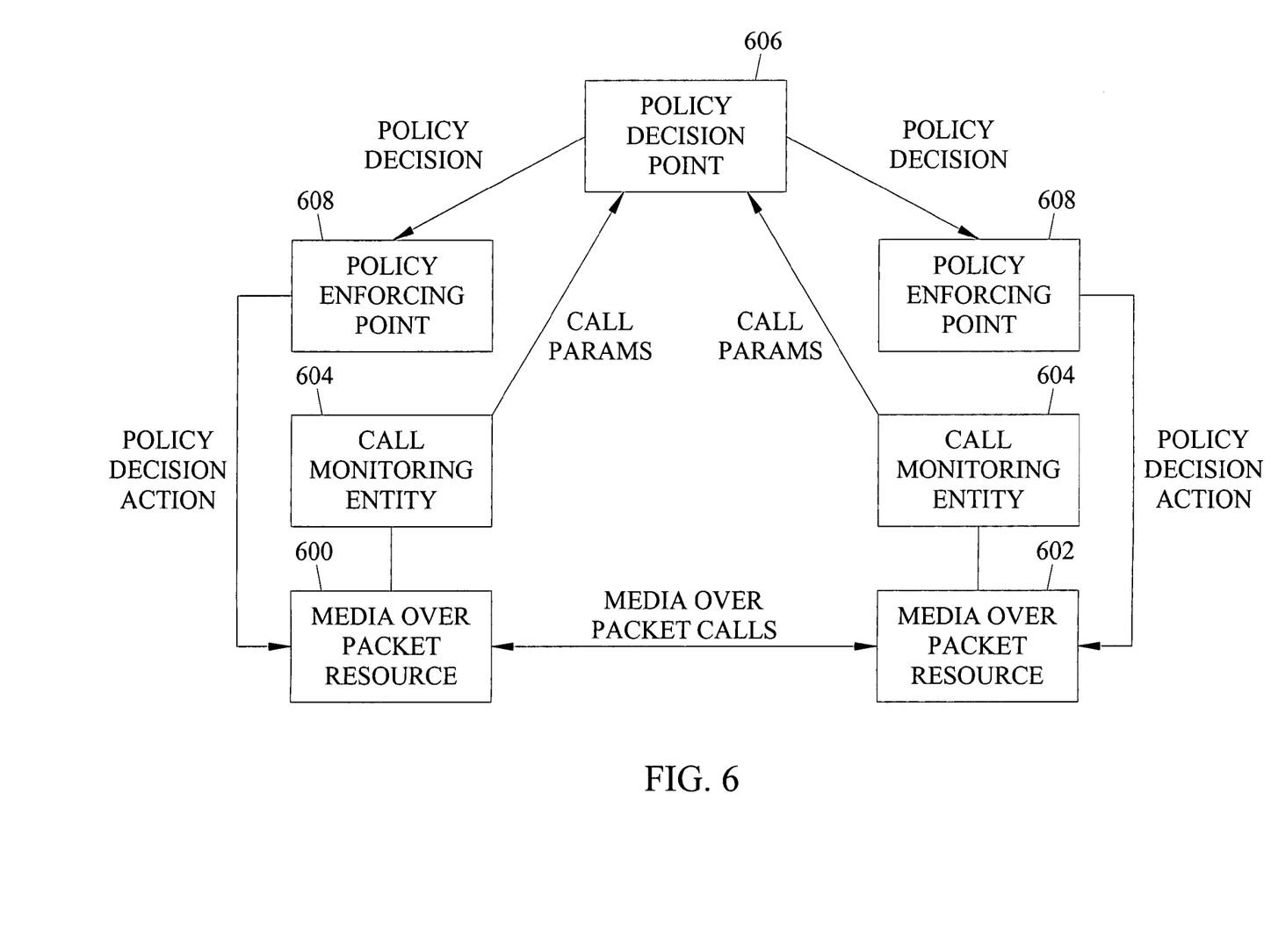
FIG. 6 is a block diagram illustrating a system for controlling remote allocation of media over packet resources according to an embodiment of the subject matter described herein.

FIG. 6 is a network diagram illustrating an exemplary system for controlling dynamic assignment of media over packet resources according to an embodiment of the subject matter described herein. Referring to FIG. 6, media over packet resources 600 and 602 are located remotely from each other and media over packet calls are established between the resources. Media over packet resources 600 and 602 may be media gateways or any other suitable resource for which media over packet calls can be established. Call monitoring entities 604 monitor calls established between media over packet resources 600 and 602. Call monitoring entities 604 may be media gateway controllers or stand-alone entities, such as network monitoring servers for monitoring any of the parameters described herein relating to media over packet calls. Call monitoring entities 604 may transmit monitored call parameters to a policy decision point 606. Policy decision point 606 may store policies relating to the establishment of calls between media over packet resources 600 and 602. Policy decision point 606 may be stand-alone computing platform that implements global policies for an entire network. Alternatively, policy decision point 606 may be a distributed entity that implements global or local policies of each media over packet resource. Policy decision point 606 receives the call parameters from call monitoring entities 604 and determines whether policies of media over packet resources 600 and 602 have been violated. Policy decision point 606 outputs policy decisions to policy enforcing points 608.

Policy enforcing points 608 perform policy decision actions based on policy decisions received from policy decision point 606. Policy enforcing points 608 may be implemented in software, for example in media gateway controllers. Alternatively, policy enforcing points 608 may be stand-alone devices. Exemplary policy decision actions that may be performed by policy enforcing points 608 include any of the actions described herein, such as sending messages for throttling or limiting calls involving media over packet resources 600 and 602.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for controlling media over packet resource assignment by a remote media gateway controller, the method comprising:

(a) at a first media gateway controller configured to control a first media over packet resource, determining whether establishment of calls involving a second media over packet resource managed by a second media gateway controller would violate a policy of the first media gateway controller;

(b) in response to determining that the establishment of calls to or from the second media over packet resource would violate a policy of the first media gateway controller, sending a message from the first media gateway controller to the second media gateway controller for limiting the establishment of calls involving the second media over packet resources; and (c) at the second media gateway controller:

(i) receiving the message, and, in response, storing status information for the second media over packet resource to indicate that the second media over packet resource is blocked; and (ii) receiving a call signaling message from the first media gateway controller that results in selection of the second media over packet resource for a call, determining that the second media over packet resource is unavailable for the call based on the stored status information, and, in response to determining that the second media over packet resource is unavailable for the call, attempting to select an alternate media over packet resource for the call.

2. The method of claim 1 wherein the message identifies the second media over packet resource and the first media over packet resource for limiting calls involving the first and second media over packet resources.

3. The method of claim 1 wherein the message identifies the second media over packet resource for limiting establishment of calls involving the second media over packet resource and all media over packet resources managed by the first media gateway controller.

4. The method of claim 1 wherein determining whether establishment of calls to or from the second voice over packet resource would violate a policy of the first media gateway controller includes, at the first media gateway controller:
   (a) monitoring at least one parameter associated with calls involving the second media over packet resource;
   (b) determining whether the parameter has a predetermined relationship with respect to a threshold value set based on the policy of the first media gateway controller; and
   (c) determining that the establishment of calls involving the second media over packet resource would violate the policy in response to determining that the parameter has the predetermined relationship with respect to the threshold value.

5. The method of claim 4 wherein monitoring at least one parameter associated with the calls involving the second media over packet resource includes measuring at least one of delay, jitter, packet loss, and reachability associated with the calls involving the second media over packet resource.

6. The method of claim 5 wherein the parameter includes delay and wherein determining whether the parameter has the predetermined relationship with respect to the threshold value includes determining whether delay associated with the calls involving the second media over packet resource exceeds a delay threshold maintained by the first media gateway controller.

7. The method of claim 5 wherein the parameter includes jitter and wherein determining whether the parameter has the predetermined relationship with respect to the threshold value includes determining whether jitter associated with the calls involving the second media over packet resource exceeds a jitter threshold maintained by the first media gateway controller.

8. The method of claim 5 wherein the parameter includes packet loss and wherein determining whether the parameter has the predetermined relationship with respect to the threshold value includes determining whether packet loss associated with the calls involving the second media over packet resource exceeds a packet loss threshold maintained by the first media gateway controller.

9. The method of claim 5 wherein the parameter includes reachability and wherein determining whether the parameter has the predetermined relationship with respect to the threshold value includes determining whether the second media over packet resource is unreachable from the first media over packet resource.

10. The method of claim 1 wherein determining whether establishment of calls involving the second media over packet resource managed by the second media gateway controller would violate a policy of the first media gateway controller includes determining whether the establishment of calls would violate a time-of-day-based policy of the first media gateway controller.

11. The method of claim 1 wherein determining whether establishment of calls involving the second media over packet resource managed by the second media gateway controller would violate a policy of the first media gateway controller includes determining whether the establishment of calls would violate a quality-of-service (QoS)-based policy of the first media gateway controller.

12. The method of claim 11 wherein the QoS-based policy includes a combination of parameter values that the call must satisfy, wherein the parameters include at least one parameter selected from a group consisting of a call bandwidth restriction, call media type, calling or called subscriber type, incoming or outgoing trunk group type, a Class-of-Service (CoS) parameter, and a QoS parameter.

13. The method of claim 1 wherein sending a message from the first media gateway controller to the second media gateway controller for limiting the establishment of calls involving the second media over packet resource includes sending a message from the first media gateway controller to the second media gateway controller for blocking calls involving the second media over packet resource.

14. The method of claim 13 comprising, in response to detecting cessation of violation of the policy of the first media gateway controller, sending a message from the first media gateway controller to the second media gateway controller for unblocking calls to or from the second media over packet resource.

15. The method of claim 1 wherein sending a message from the first media gateway controller to the second media gateway controller for limiting the establishment of calls involving the second media over packet resource includes sending a message from the first media gateway controller to the second media gateway controller for throttling calls involving the second media over packet resource.

16. The method of claim 1 wherein sending a message from the first media gateway controller to the second media gateway controller for limiting the establishment of calls involving the second media over packet resource includes sending a message from the first media gateway controller to the second media gateway controller that is distinct from call signaling messages exchanged between the first and second media gateway controllers.

17. The method of claim 1 wherein sending a message from the first media gateway controller to the second media gateway controller for limiting the establishment of calls involving the second media over packet resource includes sending a signaling message from the first media gateway controller to the second media gateway controller, wherein the signaling message includes a parameter for limiting the establishment of calls involving the second media over packet resource.

18. The method of claim 17 wherein the signaling message comprises an extension of an IP telephony signaling protocol selected from a group consisting of session initiation protocol (SIP), H.323, and bearer independent call control (BICC).

19. The method of claim 1 wherein sending the message includes periodically sending the message from the first media gateway controller to the second media gateway controller, and, at the second media gateway controller, continuing to limit calls involving the second media over packet resource in response to receiving the message.

20. The method of claim 19 comprising, at the second media gateway controller, comprising, in response to failing to receive the message within a predetermined time period, ceasing to limit the establishment of calls involving the second media over packet resource.

21. The method of claim 1 wherein sending the message includes inserting a time parameter in the message and wherein the method further comprises, at the second media gateway controller, limiting the establishment of calls involving the second media over packet resource during a time period associated with the time parameter.

22. The method of claim 21 comprising, at the second media gateway controller, ceasing to limit the establishment of calls involving the second media over packet resource outside of the time period associated with the time parameter.

23. The method of claim 1 wherein the first and second media over packet resources comprise first and second media gateways.

24. The method of claim 1 wherein the first and second media over packet resources comprise interfaces of first and second media gateways.

25. A system for controlling media over packet resource allocation by a remote media gateway controller, the system comprising:
(a) a first media gateway controller for controlling a first media over packet resource; and
(b) a second media gateway controller for controlling a second media over packet resource, wherein the first media gateway controller determines whether establishment of calls involving the second media over packet resource would violate a policy of the first media gateway controller, and, in response to determining that the establishment of calls involving the second media over packet resource would violate a policy of the first media gateway controller, sending a message from the first media gateway controller to the second media gateway controller for limiting the establishment of calls involving the second media over packet resource, wherein the second media gateway controller:
(i) receives the message, and, in response, stores status information associated with the second media over packet resource to indicate that the second media over packet resource is blocked; and
(ii) receives a call signaling message from the first media gateway controller that results in selection of the second media over packet resource for a call, determines that the second media over packet resource is unavailable for the call based on the stored status information, and, in response to the determination that the second media over packet resource is unavailable for the call, attempts to select an alternate media over packet resource for the call.

26. The system of claim 25 wherein, in determining whether establishment of calls involving the second media over packet resource would violate a policy of the first media gateway controller, the first media gateway controller:
(a) monitors at least one parameter associated with calls involving the second media over packet resource;
(b) determines whether the parameter has a predetermined relationship with respect to a threshold value set based on the policy of the first media gateway controller; and
(C) determines that the establishment of calls involving the second media over packet resource would violate the policy in response to determining that the parameter has the predetermined relationship with respect to the threshold value.

27. The system of claim 26 wherein the parameter includes at least one of delay, jitter, packet loss, and reachability associated with the calls involving the second media over packet resource.

28. The system of claim 27 wherein the parameter includes delay and wherein, in determining whether the parameter has the predetermined relationship with respect to the threshold value, the first media gateway controller determines whether delay associated with the calls involving the second media over packet resource exceeds a delay threshold maintained by the first media gateway controller.

29. The system of claim 27 wherein the parameter includes jitter and wherein, in determining whether the parameter has the predetermined relationship with respect to the threshold value, the first media gateway controller determines whether jitter associated with the calls involving the second media over packet resource exceeds a jitter threshold maintained by the first media gateway controller.

30. The system of claim 27 wherein the parameter includes packet loss and wherein, in determining whether the parameter has the predetermined relationship with respect to the threshold value, the first media gateway controller determines whether packet loss associated with the calls involving the second media over packet resource exceeds a packet loss threshold maintained by the first media gateway controller.

31. The system of claim 27 wherein the parameter includes reachability and wherein, in determining whether the parameter has the predetermined relationship with respect to the threshold value, the first media gateway controller determines whether the second media over packet resource is unreachable from the first media over packet resource.

32. The system of claim 25 wherein, in determining whether establishment of calls involving the second media over packet resource would violate a policy of the first media gateway controller, the first media gateway controller determines whether the establishment of calls would violate a time-of-day-based policy of the first media gateway controller.

33. The system of claim 25 wherein, in determining whether establishment of calls involving the second media over packet resource would violate a policy of the first media gateway controller, the first media gateway controller determines whether the establishment of calls would violate a quality-of-service (QoS)-based policy of the first media gateway controller.

34. The system of claim 25 wherein the message comprises a message for blocking calls involving the second media over packet resource.

35. The system of claim 34 wherein, in response to detecting cessation of violation of the policy, the first media gateway controller sends a message to the second media gateway controller for unblocking the establishment of calls involving the second media over packet resource.

36. The system of claim 25 wherein the message comprises a message for throttling calls involving the second media over packet resource.

37. The system of claim 25 wherein the message is distinct from call signaling messages exchanged between the first and second media gateway controllers.

38. The system of claim 25 wherein the message comprises a signaling message from the first media gateway controller to the second media gateway controller, wherein the signaling message includes a parameter for limiting the establishment of calls to or from the second media over packet resource.

39. The system of claim 25 wherein the first media gateway controller periodically sends the message to the second media gateway controller and wherein the second media gateway controller continues to limit calls involving the second media over packet resource in response to receiving the message.

40. The system of claim 39 wherein the second media gateway controller, in response to failing to receive the message within a predetermined time period, ceases to limit the establishment of calls involving the second media over packet resource.

41. The system of claim 25 the first media gateway controller includes a time parameter in the message and wherein the second media gateway controller limits the establishment of calls involving the second media over packet resource during a time period associated with the time parameter.

42. The system of claim 41 wherein the second media gateway controller ceases to limit the establishment of calls involving the second media over packet resource outside of a time period associated with the time parameter.

43. The system of claim 25 wherein the first and second media over packet resources comprise first and second media gateways.

44. The system of claim 25 wherein the first and second media over packet resources comprise interfaces of first and second media gateways.

45. The system of claim 25 wherein the message identifies the second media over packet resource and the first media over packet resource for limiting calls involving the first and second media over packet resources.

46. The system of claim 25 wherein the message identifies the second media over packet resource for limiting establishment of calls involving the second media over packet resource and all media over packet resources managed by the first media gateway controller.

47. A computer program product comprising computer-executable instructions embodied in a computer-readable medium for performing steps comprising:
(a) at a first media gateway controller configured to control a first media over packet resource, determining whether establishment of calls involving a second media over packet resource managed by a second media gateway controller would violate a policy of the first media gateway controller;
(b) in response to determining that the establishment of calls involving the second media over packet resource would violate a policy of the first media gateway controller, sending a message from the first media gateway controller to the second media gateway controller for limiting the establishment of calls involving the second media over packet resources; and
(c) at the second media gateway controller:
  (i) receiving the message, and, in response, storing status information for the second media over packet resource to indicate that the second media over packet resource is blocked; and
  (ii) receiving a call signaling message from the first media gateway controller that results in selection of the second media over packet resource for a call, determining that the second media over packet resource is unavailable for the call based on the stored status information, and, in response to determining that the second media over packet resource is unavailable for the call, attempting to select an alternate media over packet resource for the call.

* * * * *

UNITED STATES PATENT AND TRADEMARK OFFICE
CERTIFICATE OF CORRECTION

PATENT NO. : 7,613,111 B2
APPLICATION NO. : 11/108353
DATED : November 3, 2009
INVENTOR(S) : Soncodi It is certified that error appears in the above-identified patent and that said Letters Patent is hereby corrected as shown below:

Title page 1, Item (54)
    replace "METHODS, SYSTEMS, AND COMPUTER PROGRAM PRODUCTS FOR DYNAMIC BLOCKING AN UNBLOCKING OF MEDIA OVER PACKET RESOURCES"
    with --METHODS, SYSTEMS, AND COMPUTER PROGRAM PRODUCTS FOR DYNAMIC BLOCKING AND UNBLOCKING OF MEDIA OVER PACKET RESOURCES--.

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,613,111 B2  Page 1 of 1
APPLICATION NO. : 11/108353
DATED : November 3, 2009
INVENTOR(S) : Soncodi

It is certified that error appears in the above-identified patent and that said Letters Patent is hereby corrected as shown below:

Title page, Item (54) and at Column 1, lines 1-4, title,
        replace "METHODS, SYSTEMS, AND COMPUTER PROGRAM PRODUCTS FOR DYNAMIC BLOCKING AN UNBLOCKING OF MEDIA OVER PACKET RESOURCES"
        with --METHODS, SYSTEMS, AND COMPUTER PROGRAM PRODUCTS FOR DYNAMIC BLOCKING AND UNBLOCKING OF MEDIA OVER PACKET RESOURCES--.

This certificate supersedes the Certificate of Correction issued December 22, 2009.

Signed and Sealed this

Twelfth Day of January, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,613,111 B2 |
| APPLICATION NO. | : 11/108353 |
| DATED | : November 3, 2009 |
| INVENTOR(S) | : Adrian C. Soncodi |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1175 days.

Signed and Sealed this

Nineteenth Day of October, 2010

David J. Kappos
*Director of the United States Patent and Trademark Office*